United States Patent [19]

Deutschländer

[11] Patent Number: 4,815,581
[45] Date of Patent: Mar. 28, 1989

[54] APPARATUS FOR SEPARATING ITEMS CONVEYED IN A CONTACTING SERIES

[75] Inventor: Gert Deutschländer, Neuhausen am Rheinfall, Switzerland

[73] Assignee: SIG Schweizerische Industrie-Gesellschaft, Neuhausen am Rheinfall, Switzerland

[21] Appl. No.: 878,270

[22] Filed: Jun. 25, 1986

[30] Foreign Application Priority Data

Jun. 26, 1985 [CH] Switzerland .................. 2736/85

[51] Int. Cl.$^4$ .............................................. B65G 47/31
[52] U.S. Cl. ........................................ 198/461; 198/606; 198/689.1; 198/811; 198/817; 271/197
[58] Field of Search ............... 198/461, 689.1, 817, 198/606, 575, 576, 460, 811; 271/197, 276

[56] References Cited

U.S. PATENT DOCUMENTS

| 1,278,537 | 9/1918 | Wegner | 198/689.1 |
| 3,197,201 | 7/1965 | Craig | 198/689.1 X |
| 3,482,675 | 12/1969 | Hutz | 198/606 X |
| 3,517,925 | 6/1970 | Hutz | 198/606 X |
| 3,608,697 | 9/1971 | Wahle et al. | 198/689.1 X |
| 3,675,761 | 7/1972 | Hall | 198/689.1 |
| 3,889,801 | 6/1975 | Boyer | 198/689.1 |
| 4,195,723 | 4/1980 | Loewenthal | 198/461 |
| 4,294,344 | 10/1981 | van Maanen | 198/461 |
| 4,530,632 | 7/1985 | Sela | 198/689.1 X |
| 4,558,777 | 12/1985 | Francioni | 198/461 |
| 4,607,744 | 8/1986 | Pak | 198/461 |

FOREIGN PATENT DOCUMENTS

| 2346407 | 3/1974 | Fed. Rep. of Germany . |
| 598996 | 5/1978 | Switzerland . |
| 619667 | 10/1980 | Switzerland . |
| 1545058 | 5/1979 | United Kingdom . |

Primary Examiner—Robert J. Spar
Assistant Examiner—Lyle Kimms
Attorney, Agent, or Firm—Spencer & Frank

[57] ABSTRACT

An apparatus for separating articles advanced in series and in a mutually contacting relationship, includes a first conveyor advancing the articles in a series and in contact with one another on a first conveyor surface, and a second conveyor arranged for receiving articles from the first conveyor and advancing the articles in series on a second conveyor surface. The second conveyor has a conveying speed greater than that of the first conveyor, whereby the articles are advanced on the second conveyor surface in a spaced relationship to one another. There is further provided a third conveyor having article carriers which convey the articles downstream of the second conveyor surface as viewed in a direction of article advance. A suction device generates, in zones of the first and second conveyors, a force exerted on the articles and oriented for pressing the articles against the first and second conveyor surfaces.

9 Claims, 2 Drawing Sheets

APPARATUS FOR SEPARATING ITEMS CONVEYED IN A CONTACTING SERIES

BACKGROUND OF THE INVENTION

This invention relates to an apparatus for separating articles which, advanced serially on a first conveyor with a first conveying speed, are at least in a partial engagement with one another. The articles are transferred onto a second conveyor with a second conveying speed which is greater than the first conveying speed. Because of this speed difference, the articles are advanced on the second conveyor at a greater mutual spacing than on the first conveyor. A third conveyor, provided with article carriers, advances the spaced articles to a packing machine.

It is known that in the packaging art, in order to utilize the full capacity of a machine, the articles to be packaged have to be admitted thereto in a sequence which can be set to the operational cycle of the machine. To be able to fulfil this condition, conventionally a conveyor is provided, by means of which the distance between two successive individual items is changed (increased). For this purpose, a first conveyor is succeeded by a second conveyor which, as noted above, runs with a greater speed than the first conveyor to thus effect an increase of the distance between the articles.

An arrangement of the above-outlined type is described, for example, in German Offenlegungsschrift (published non-examined application) No. 2,346,407. In the machine described therein, the individual items, as they are advanced in a contacting series on a first conveyor belt, are transferred to a second conveyor belt which has a greater conveying speed, as a result of which the individual items have an increased distance from one another on the second conveyor. There is provided a third conveyor which is equipped with article carriers and which serves to adjust the individual items to an exact distance from one another prior to introducing them into a packing machine. A sensor which is provided between the first and the second conveyor belts is intermittently actuated such that the period of it actuated state corresponds to the length of the individual items as they are advanced with the conveying speed on the first conveyor belt. The conveying speed of the first conveyor belt is controlled with the aid of such a length measurement, while taking into consideration the phase position of the third conveyor.

In case the individual items are, for example, chocolate bars having an irregular shape and a length tolerance of ±10%, the above-described dynamic control may lead to erroneous distances between articles, resulting in an incomplete utilization of the capacity of the packing machine. Further, such a conventional regulation could work effectively only during operation in the routine run: in case of sudden changes in the output such as an emergency stop or high-acceleration start, the operational safety in a machine operating with a packaging frequency of at least 200 articles per minute could be insufficient.

Swiss Patent No. 619,667 discloses an apparatus in which between the second and third conveyor, that is, between the conveyor belt and the conveyor for introducing the articles into the packaging machine with carrier members, there is provided a stop plate with which cooperates a sensor which, by means of a limit switsch synchronized with the third conveyor, controls the distance between the separated articles and thus controls the second conveyor. It is a disadvantage of such an apparatus that in case of an emergency stop, the articles, because of their inertia, shift in their direction of travel relative to the conveyor belt in an uncontrolled and impermissible manner so that a disturbance-free automatic restart cannot be effected. The stop plate constitues a discontinuity in the conveyor path and reduces the operational safety of the apparatus due to the discontinuous conveyance of the individuals items and the increased friction inherent in its operation. Further, the separation of the articles is effected solely by the third conveyor with which the articles are taken from the stop plate. This circumstance causes a momentary standstill followed by an acceleration of the articles, and thus, the machine output has to be made dependent on the type of the articles. In case of fragile items the approximate maximum permissible output was found to be 200 items per minute.

SUMMARY OF THE INVENTION

It is an object of the invention to provide an improved apparatus of the above-outlined type which is capable of handling items of different lengths without the need for major resetting, with which articles of irregular surfaces may be processed in the same satisfactory manner as articles of uniform surfaces and further, whose output may be increased as compared to prior art arrangements. It is a further object of the invention to ensure an operational safety in that after machine stoppage an automatic restart without manual interference is feasible.

These objects and others to become apparent as the specification progresses, are accomplished by the invention, according to which, briefly stated, the first conveyor and the second conveyor are submitted to a vacuum for drawing air in order to generate a pressure on the individual items for pressing them against the respective conveyor.

DESCRIPTION OF THE PREFERRED EMBODIMENT

Figure 1:
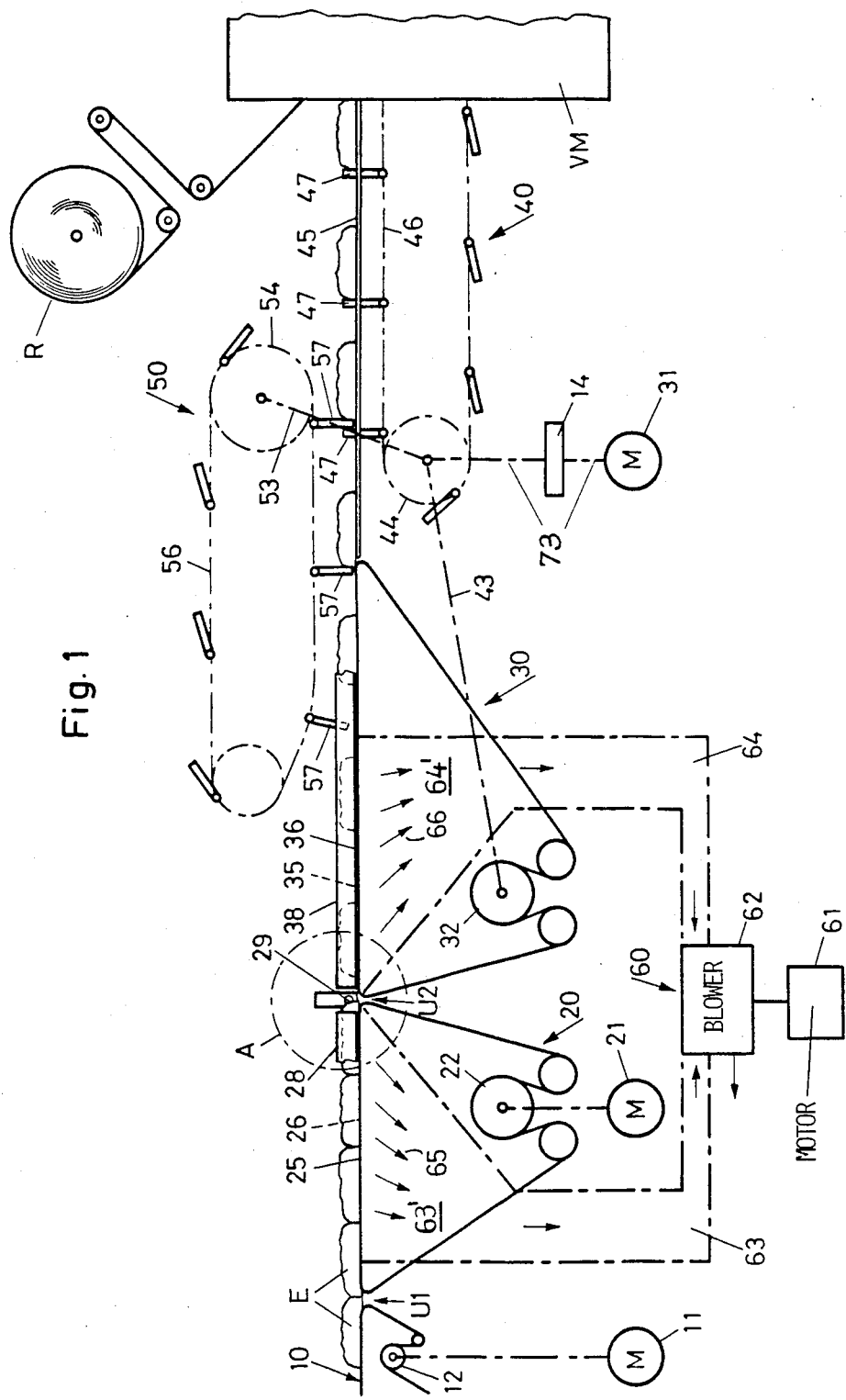
FIG. 1 is a schematic side elevational view of a preferred embodiment of the invention.

Turning now to FIG. 1, in the apparatus illustrated therein, individual articles E are transferred at a first transfer location U1 from a conveyor 10 of an article making machine (not shown) to a first conveyor 20 which serves to collect and accumulate the articles which are thus in a mutual contacting relationship on the conveyor 20. At the downstream end of the first conveyor 20 there is situated a second transfer location U2 where articles are transferred to an upstream end of a second conveyor 30 which travels at a greater speed than the conveyor 20, and thus the articles are in a separated state as they are advanced on the conveyor 30. A third conveyor 40 is constituted by a conveyor chain 46 for advancing the individual articles E with article pushers (carriers) 47. The conveyor 40 introduces the articles to a packing machine VM at a predetermined speed and at a precise spacing. Between the second and the third conveyors 30 and 40 there is arranged a fourth conveyor 50 which is situated above the conveying path of the articles E.

The conveyors 10, 20 and 30 are constituted by endless conveyor belts which are driven by drive rollers 12, 22 and 32 rotated by respective motors 11, 21 and 31. Respective deflecting rollers on either side of drive rollers 12, 22 and 32 ensure a required frictional contact of the belts with the respective drive roller. While the motors 11 and 21 drive only a single conveyor 10 or 20, respectively, the motor 31 is designed to operate the packing machine VM and the three conveyors 30, 40 and 50. For this purpose the drive sprockets 44 and 54 of the third conveyor 40 and the fourth conveyor 50 and the drive roller 32 of the second conveyor 30 are coupled to one another as symbolically indicated by the dash-dotted lines 43, 53 and 73, while the packing machine VM is conventionally operated by the motor 31 via the chain 46 of the conveyor 40.

According to the invention, there is provided a suction device 60 serving the first conveyor 20 and the second conveyor 30 for drawing air from the zone of the respective conveyor belts.

The suction device 60 comprises drive motor 61 coupled to a blower 62, and air ducts 63 and 64 (shown with dash-dotted lines) which widen into upwardly open respective hoods 63', 64' positioned immediately under the conveyor belts of the conveyors 20 and 30. By virtue of this construction, air is drawn in the direction of the arrows 65 from the first conveyor 20 and in the direction of the arrows 66 from the second conveyor 30.

Figure 3:
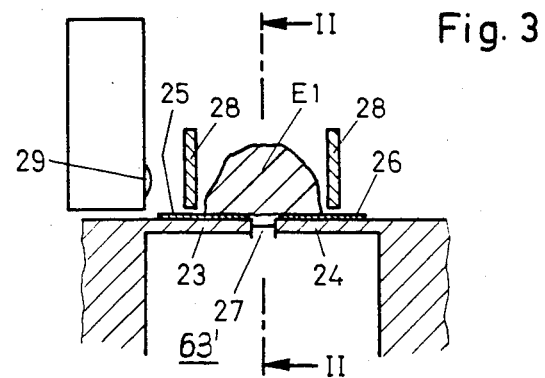
FIG. 3 is a sectional view taken along line III—III of FIG. 2.

Turning to FIG. 3, there is shown in cross section a zone of the first conveyor 20. The latter is formed of two co-travelling conveyor belts 25 and 26 supported on respective backup plates 23 and 24. The backup plates 23 and 24 are separated from one another by a slot 27 which also constitutes the distance between the two conveyor belts 25 and 26. An individual item E1 situated on the conveyor belts 25 and 26 is, by virtue of the suction stream passing through the slot 27, the hood 63' and the air duct 63, pressed by the overhead atmospheric pressure against the conveyor belts 25 and 26. As seen in FIG. 1, the conveyor 20 is exposed to the suction effect substantially along its entire length. The conveyor 30 associated with the vacuum duct 64 is structured similarly to the conveyor 20 as described in connection with FIG. 3, and accordingly, has two parallel-spaced conveyor belts 35 and 36.

It was found that the individual items need not engage the conveyor belts 25 and 26 with a flat surface; rather, it is sufficient if they contact the same at three points and otherwise are at a distance therefrom as it is often the case with chocolate bars with a nut filling which have marked protuberances on their large faces.

Tests conducted with chocolate bars having a length of approximately 120 mm, a width of 30 mm, a height of 20 mm and a weight of approximately 50 g showed that the acceleration values without the use of vacuum according to the invention, should not exceed approximately 1 m/sec$^2$ to ensure that the chocolate bar does not move relative to the belt after stopping or restarting the belt. It was further found that in case a vacuum of approximately 0.1 bar was used, such accelerations did not cause a relative displacement between the bars and the conveyor belts even at accelerations or decelerations in excess of 100 m/sec$^2$.

The transfer location U2 bounded by the downstream end (discharge end) of the relatively slow first conveyor 20 and the upstream end (input end) of the relatively rapidly moving second conveyor 30 is a critical zone, because there the individual items E, in case they are still connected (sticking) to one another, have to be moved away from one another or at least separated. To ensure a satisfactory operation, the transfer has to be performed in a controlled manner rather than by means of a passive element as would be the case if a plate is used to bridge an intermediate space between the upper reach of the consecutive first and second conveyors 20 and 30, respectively.

Figure 2:
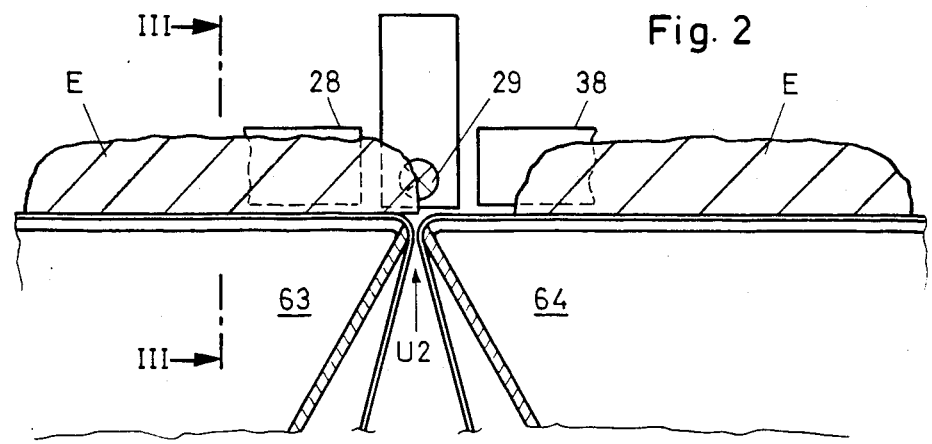
FIG. 2 is an enlarged schematic sectional side elevational view of inset A of FIG. 1, taken along line II—II of FIG. 3.

The adjoining terminal portions of the two conveyors 20 and 30 (that is, their respective adjoining downstream and upstream ends) are, as shown in FIG. 2, formed as deflection edges, so that the individual items E are pushed directly from the conveyor 20 onto the conveyor 30. As may be observed in FIG. 1, by virtue of the arrangement of the hoods 63', 64' at the respective conveyors 20 and 30, the vacuum is effective along the entire length of the first conveyor 20 up to and substantially including the downstream end thereof and, as regards the second conveyor 30, the vacuum is effective from the deflecting edge (upstream end) to a location where the third conveyor 50 takes over the conveyance of the articles.

At the transfer station U2 there is positioned a light barrier 29 and further, lateral guides 28 and 38 are provided which serve the purpose of preventing the individual items E—because of a change in speed—from leaving the conveyor belt, for example, in case of an emergency stop or in case of high-acceleration restart.

The third conveyor 40 constitutes the supply arrangement for the packing machine VM which is of known construction and may be of the type noted in Swiss Patent No. 598,996. FIG. 1 schematically illustrates a supply reel R for the wrapper material. The conveyor 40 is constituted by a conveyor chain 46 which is situated underneath a conveyor track 45 and which has rotatably mounted article carriers (pushers) 47. The carriers 47 are, on their way to the sprocket 44, folded flat onto the conveyor chain 46 and shortly before reaching the beginning of their working path, assume an upright position in the upper conveyor reach. For controlling this arrangement, conventional cam discs and followers are used.

A fourth conveyor 50 is located above the conveyor track 45 and is constituted by a chain conveyor having a conveyor chain 56 to which there are pivotally mounted article carriers (pushers) 57. As shown in FIG. 1, the individual articles E are engaged by the carriers 57 at a time when the articles are still on the second conveyor 30. In order to permit a ready compensation (shift) of the position between an article E and an article carrier 57, the vacuum duct 64 is effective only shortly upstream of a location where the article carriers 57 arrive in engagement with the respective articles. The spacing between the article carriers 57 of the conveyor 50 is greater than the spacing between the article carriers 47 of the conveyor 46.

Figure 4:
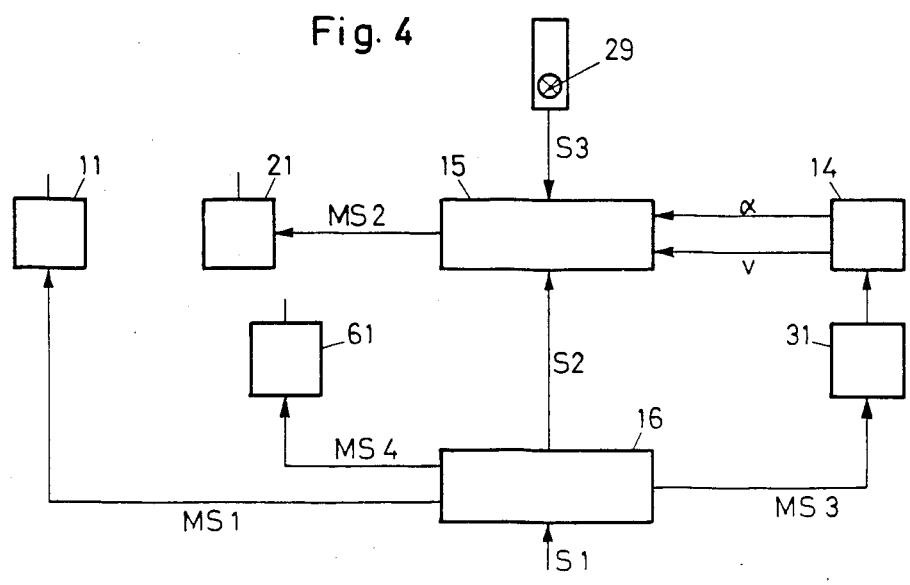
FIG. 4 is a block diagram of an electric circuit for controlling the drive motors shown in FIG. 1

Turning now to the block diagram illustrated in FIG. 4, there are shown two control circuits 15 and 16. The control circuit 16 is energized manually by applying thereto a first control signal S0 which starts the motors 11, 21 and 61 by means of actuating signals MS1, MS2 and MS4. By means of a second control signal S1 the motor 31 is started by an actuating signal MS3 and its rpm controlled in a manner as disclosed, for example, in Swiss Patent No. 598,996. As a function of the rpm of the motor 31 an angle information α and a velocity information v regarding the motor 31 is generated by means of a clock tachogenerator 14 and applied to the control circuit 15 which also receives a control signal S2 from the control circuit 16 and a control signal S3 from the light barrier 29. From these signals the control circuit 15 determines the desired conveyor velocity of the first conveyor 20 and accordingly varies the actuating signal MS2 to the motor 21 for setting the article quantities which gather on the conveyor 20.

In the description which follows, the operation of the above-described apparatus will be set forth.

In addition to the packing machine VM, the motor 31 drives the chain 46 of the third conveyor 40, the chain 56 of the fourth conveyor 50 and the second conveyor 30 with fixed speed relationships relative to one another.

The conveyor belt 10 is in continuous operation and delivers the individual items E which are manufactured by an upstream production machine and which are transferred to the collector belt of the first conveyor 20. The collector belt is driven by the motor 21 and is controlled by the control circuit 15 schematically illustrated in FIG. 4.

Upon starting the apparatus, the collector belt of the conveyor 20 delivers articles even during a standstill of the packing machine VM, until the first individual item has reached the light barrier 29 which thus generates a signal S3. As a result, the first conveyor 20 is stopped and because all the articles on the first conveyor 20 are exposed to the suction effect of the air stream passing through the duct 63, each individual article is pressed against the belt 25, 26 and therefore stops therewith as a unit, thus, without any relative displacement with respect to the stopped belt.

The motor 21 of the first conveyor 20 is, upon restart of the packing machine VM, controlled by the clock tachogenerator 14 in such a manner that the above-noted leading individual article is at the correct moment brought to the second conveyor 30 where, again, it is pressed against the conveyor belt by vacuum and is therefore immediately accelerated without any motion relative to the conveyor belt. In this manner, the individual articles arrive with the correct timing into the receiving zone of the fourth conveyor 50.

During normal operation of the packing machine VM the output of the conveyor apparatus is adapted from zero to approximately 600 items per minute. Accelerations and delays during starts, emergency stops or other stoppages effect, at the most, a negligible positional shift of the individual articles relative to the conveyor belts of the conveyors 20 and 30. Such a shift is, in any event, compensated for by the conveyor 50 even before the articles arrive onto the conveyor 40.

The invention permits the packing machine to be designed for a very high output, and the operational safety is ensured in each stage of the article handling process. The transport of the articles is synchronous even at restart following, for example, an emergency stop. Resetting the apparatus for another type of article, for example, to chocolate of a length of 40 mm instead of previous articles of a length of 120 mm, may be effected without significant work input. The length differences in the same type of articles are automatically compensated for between wide limits. It is known that individual successive articles may be connected to one another, for example, by a chocolate coating. By virtue of the vacuum utilized according to the invention, there is generated a pressing effect resulting in an automatic separation of such connected article pairs. It is a further advantage of the apparatus according to the invention that because of the significant reduction of a sliding friction effect, no soiling is experienced because the articles are conveyed precisely with the speed of the conveyor mechanisms.

It will be understood that the above description of the present invention is susceptible to various modifications, changes and adaptations, and the same are intended to be comprehended within the meaning and range of equivalents of the appended claims.

What is claimed is:

1. In an apparatus for separating articles advanced in series and in a mutually contacting relationship, including a first conveyor advancing the articles in a series and in contact with one another on a first conveyor surface; said first conveyor having a discharge end; a second conveyor having an input end receiving articles from said discharge end of said first conveyor and advancing the articles in series on a second conveyor surface; said second conveyor having a conveying speed greater than that of said first conveyor, whereby the articles are advanced on said second conveyor surface in a spaced relationship to one another; a transfer location situated between and being bound by said discharge end of said first conveyor and said input end of said second conveyor; and a third conveyor having article carriers mounted thereon; said article carriers being arranged for conveying the articles downstream of said second conveyor surface as viewed in a direction of article advance; the improvement comprising suction means for generating, in zones of said first and second conveyors, a force exerted on said articles and oriented for pressing said articles against said first and second conveyor surfaces; said suction means comprising a first suction arrangement extending along a length portion of said first conveyor up to said transfer location and a second suction arrangement extending along a length portion of said second conveyor up to said transfer location whereby during the transfer of any two contacting consecutive articles from the first conveyor to the second conveyor, the trailing article of the two consecutive articles is exposed to the pressing force of the first suction arrangement on the first conveyor and simultaneously the leading article of the two consecutive articles is exposed to the pressing force of the second suction arrangement on the second conveyor to positively separate the leading article from the trailing article by a pulling force pulling away the leading article from the trailing article; said pulling force being derived from the pressing forces of said first and second suction arrangements and the speed difference between the first and second conveyors.

2. An apparatus for separating articles as defined in claim 1, wherein said first and second conveyors each comprise at least two parallel-arranged conveyor belts, together forming a respective said conveyor surface; the conveyor belts of the respective first and second conveyors being spaced from one another to define therebetween a slot-like clearance extending parallel to a direction of article advance; an air stream generated by said suction means passing through said clearance.

3. An apparatus for separating articles as defined in claim 2, wherein said first and second conveyor surfaces are of generally horizontal orientation, and further wherein said suction means includes upwardly open suction hoods situated immediately below said first and second conveyor surfaces, an air stream generating source and duct means connecting said hoods with said air stream generating source.

4. An apparatus for separating articles as defined in claim 2, wherein said first conveyor has a discharge end and further comprising a first deflecting edge supporting said conveyor belts of said first conveyor at said discharge end thereof and being arranged for changing an orientation of the conveyor belts of the first conveyor for effecting a transition from upper conveyor flights to lower conveyor flights; a second deflecting edge supporting said conveyor belts of said second conveyor at said input end thereof and being arranged for changing an orientation of the conveyor belts of said second conveyor for effecting a transition from upper conveyor flights to lower conveyor flights; said clearances associated with the conveyor belts of said first and second conveyors extending to the deflecting edges of said first and second conveyors.

5. An apparatus for separating articles as defined in claim 4, further comprising lateral guide members situated along said first and second conveyors adjacent said article transfer location.

6. An apparatus for separating articles as defined in claim 2, wherein said first and second conveyor surfaces are of generally horizontal orientation; said third conveyor being situated at a level below said second conveyor surface, and said article carriers of said third conveyor being arranged for engaging said articles from below; further comprising a fourth conveyor situated at a level above said second conveyor surface and extending in a zone between said second and third conveyors; said fourth conveyor having article carriers arranged for engaging, from above, the articles during their advance on said second conveyor surface.

7. An apparatus for separating articles as defined in claim 6, wherein said clearance associated with said second conveyor extends from said input end thereof to a location, at the most, where said article carriers of said fourth conveyor arrive into engagement with the articles advanced on said second conveyor surface.

8. An apparatus for separating articles as defined in claim 6, wherein said article carriers of said fourth conveyor have, in a direction of article advance, a spacing different from that between the article carriers of said third conveyor.

9. An apparatus for separating articles as defined in claim 8, wherein the distance between the article carriers of said fourth conveyor is greater than the distance between the article carriers of said third conveyor.

* * * * *